(12) United States Patent
Hastings

(10) Patent No.: US 6,393,710 B1
(45) Date of Patent: May 28, 2002

(54) COMBINATION TAPE MEASURE AND STRAIGHT EDGE APPARATUS

(76) Inventor: Michael R. Hastings, 25 Dole Rd., Gill, MA (US) 01376

( * ) Notice: Subject to any disclaimer, the term of this patent is extended or adjusted under 35 U.S.C. 154(b) by 0 days.

(21) Appl. No.: 09/593,869

(22) Filed: Jun. 14, 2000

(51) Int. Cl.[7] .............................. B43L 7/027; G01B 3/10
(52) U.S. Cl. .............................. 33/484; 33/760; 33/768
(58) Field of Search .......................... 33/474, 429, 476, 33/481, 480, 482, 483, 484, 760, 448, 759, 491, 485, 755, 761, 768, 770, 769, 495–500

(56) References Cited

U.S. PATENT DOCUMENTS

| | | | | |
|---|---|---|---|---|
| 532,658 A | * | 1/1895 | Gillespie | 33/495 |
| 726,973 A | * | 5/1903 | McKinnon | 33/495 |
| 942,583 A | * | 12/1909 | Neeld | 33/495 |
| 1,275,822 A | * | 8/1918 | Zumwalt | 33/495 |
| 1,286,525 A | * | 12/1918 | Buck | 33/494 |
| 2,571,569 A | * | 10/1951 | Greenwood | 33/768 |
| 4,106,201 A | * | 8/1978 | Hansen | 33/75 R |
| 4,451,993 A | * | 6/1984 | Yauk | 33/472 |
| 5,170,568 A | * | 12/1992 | Wright | 33/480 |
| 5,359,782 A | * | 11/1994 | Langmaid | 33/415 |
| 5,481,810 A | * | 1/1996 | Hasting et al. | 33/484 |
| 5,727,325 A | * | 3/1998 | Mussell | 33/429 |
| 5,809,662 A | * | 9/1998 | Skinner | 33/768 |
| 5,848,481 A | * | 12/1998 | Parsons et al. | 33/760 |
| 6,047,481 A | * | 4/2000 | Bond | 33/768 |
| 6,158,138 A | * | 12/2000 | Katz | 33/760 |
| 6,212,788 B1 | * | 4/2001 | Zerkle | 33/767 |

* cited by examiner

Primary Examiner—Diego Gutierrez

(57) ABSTRACT

A combination tape measure and straight edge apparatus includes a first straight edge segment which includes an outer edge and an inner edge which includes first hinge members. A tape measure assembly support unit includes second hinge members that engage the first hinge members. A tape measure assembly is provided, and a connector is provided for attaching the tape measure assembly to the tape measure assembly support unit. The second hinge members of the tape measure assembly support unit permit the tape measure assembly support unit and the attached tape measure assembly to be rotated around the first hinge members so that the tape measure assembly can selectively be moved to and from a storage orientation and a plurality of in-use orientations. A second straight edge segment and a third straight edge segment form an isosceles right triangle along with the first straight edge segment. The tape measure assembly support unit includes riser members which support the second hinge members. A support floor supports the riser members which extend downward therefrom. The bottom of the tape measure assembly rests upon the support floor. A first standing wall and a second standing wall are connected to the support floor and extend upward therefrom. The tape measure assembly is connected to the first standing wall. A lock tab support extends upward from the second standing wall, and a pair of lock tabs on the lock tab support engage inside locking portions of the respective second and third straight edge segments.

13 Claims, 4 Drawing Sheets

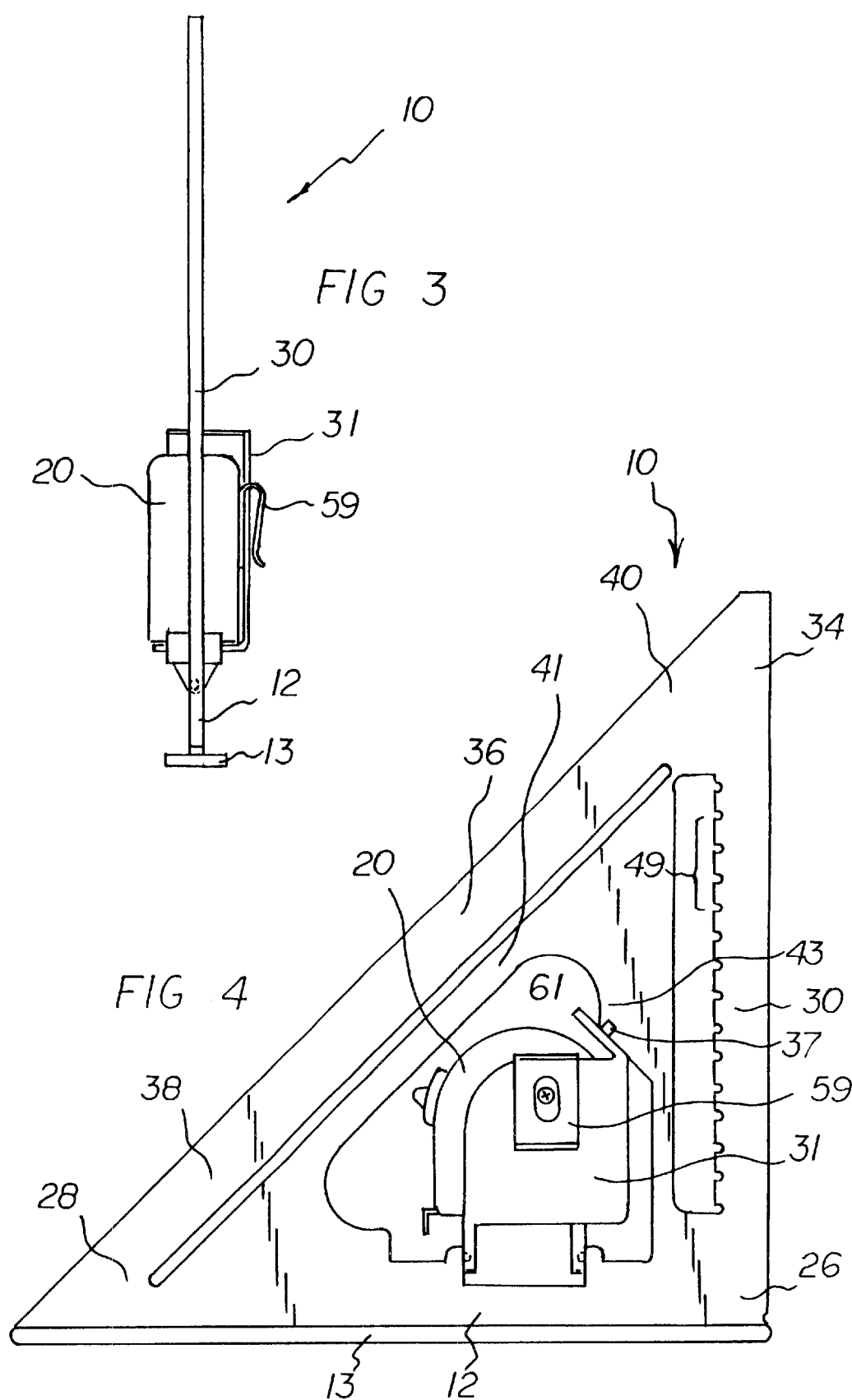

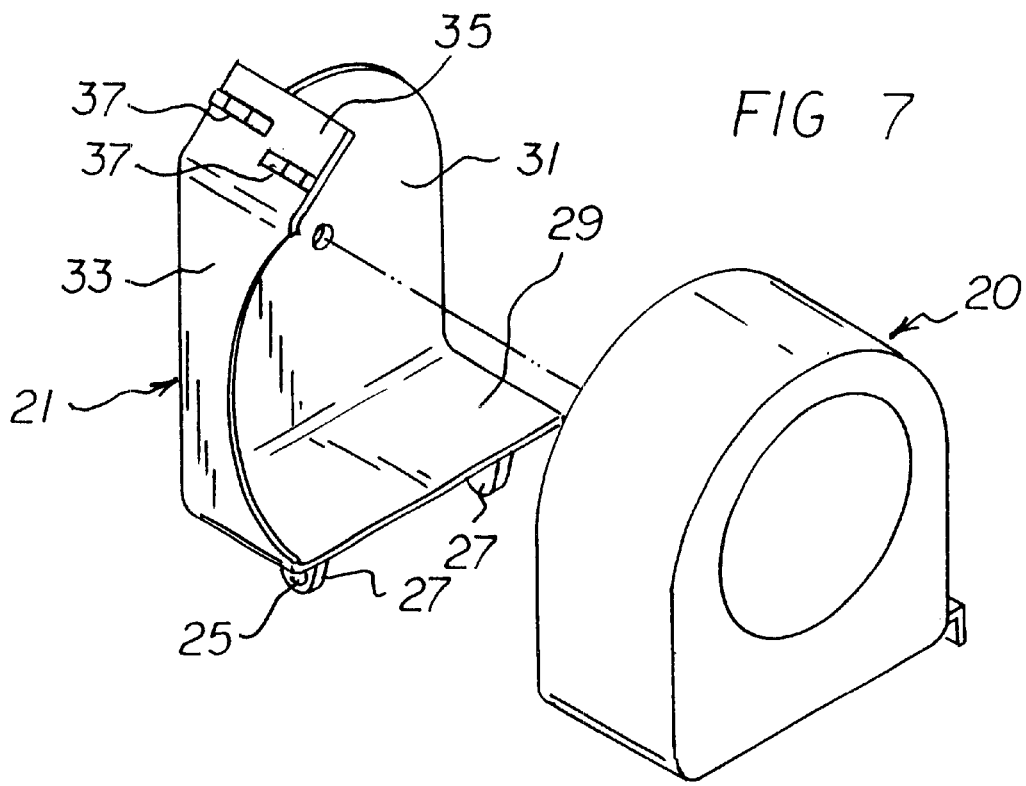
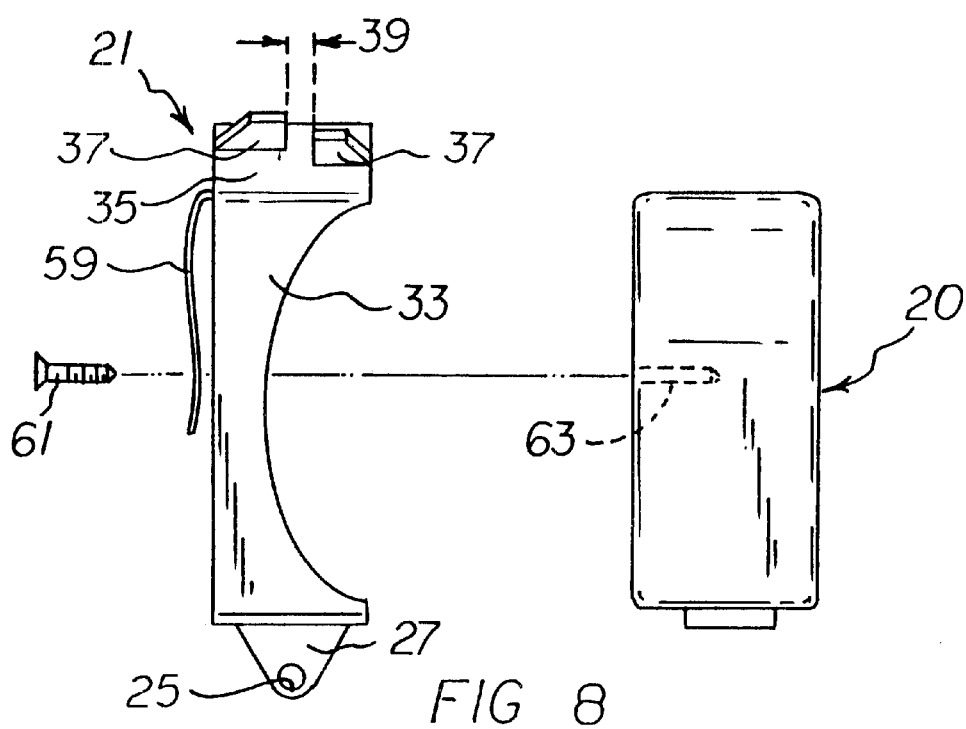

COMBINATION TAPE MEASURE AND STRAIGHT EDGE APPARATUS

BACKGROUND OF THE INVENTION

1. Field of the Invention

The present invention relates generally to measuring and drawing instruments and, more particularly, to tape measures and to triangles.

2. Description of the Prior Art

Tape measures are compact and portable devices used for measuring lengths. Triangles are substantially flat, planar devices used for measuring and drawing straight lines. Though compact, tape measures have a width that is at least as wide as the tape in the tape measure. Actually, the tape measures are wider than the tape to account for the tape measure housing. On the other hand, a triangle has a much smaller width than the tape measure. U.S. Pat. No. 5,481,810, of the present inventor, provides the combination of a tape measure and a triangle.

Moreover, in the present case, the inventor provides a number of improvements over the device set forth in U.S. Pat. No. 5,481,810. In this respect, U.S. Pat. No. 5,481,810 is incorporated herein by reference. More specifically, in U.S. Pat. No. 5,481,810, the hinge assembly includes a hinge pin supported at each end by portions of the first straight edge segment, and a sleeve member jackets the hinge pin. To simplify construction of a combination tape measure and straight edge apparatus, it would be desirable if it would not be necessary to have a hinge pin and a sleeve for the hinge pin.

In U.S. Pat. No. 5,481,810, the hinge pin sleeve is connected to a riser member which is connected to the bottom side of the tape measure assembly. As a result, the tape measure assembly must be specially fabricated for the combination tape measure and straight edge apparatus disclosed in U.S. Pat. No. 5,481,810. To improve versatility and interchangeability, it would be desirable if a combination tape measure and straight edge apparatus were provided which permits a number of standard tape measure assemblies to be used interchangeably with the apparatus.

In U.S. Pat. No. 5,481,810, the tape measure assembly is fixed to the combination tape measure and straight edge apparatus. There may be times, however, when it would be desirable to use the tape measure assembly separate and apart from the straight edge. In this respect, it would be desirable if a combination tape measure and straight edge apparatus were provided which permits the tape measure assembly to be used separately and independently of the straight edge.

In U.S. Pat. No. 5,481,810, the tape measure assembly freely rotates around the hinge pin. There is no lock to lock the tape measure assembly in a selected orientation with respect to the straight edge. More specifically, it would be desirable to lock the tape measure assembly in an orientation so that the tape measure assembly is substantially coplanar with the straight edge.

With the device in U.S. Pat. No. 5,481,810, the orientation of the tape measure assembly for orienting the tape as it is being payed out is selected to be either in the direction of one side of the right triangle of the straight edge or in the direction of the hypotenuse of the right triangle. With the hinge assembly provided in U.S. Pat. No. 5,481,810, it is difficult to change the orientation of the tape assembly for paying out the tape in a different orientation. In this respect, it would be desirable if a combination tape measure and straight edge apparatus were provided in which it is relatively easy to change the orientation of the tape assembly for paying out tape in a different direction.

Still other features would be desirable in a combination tape measure and straight edge apparatus. For example, a tape measure assembly often has an attached clip so that the tape measure assembly can be clipped onto a user's belt. In this respect, it would be desirable if a combination tape measure and straight edge apparatus were provided that can employ a belt clip that is attached to a tape measure assembly.

Thus, while the foregoing body of prior art indicates it to be well known to use a combination tape measure and straight edge apparatus such as disclosed in U.S. Pat. No. 5,481,810, the prior art described above does not teach or suggest a combination tape measure and straight edge apparatus which has the following combination of desirable features: (1) is not necessary to have a hinge pin and a sleeve for the hinge pin; (2) permits a number of standard tape measure assemblies to be used interchangeably with the apparatus; (3) permits the tape measure assembly to be used separately and independently of the straight edge; (4) permits the tape measure assembly to be locked in an orientation so that the tape measure assembly is substantially coplanar with the straight edge; (5) is relatively easy to change the orientation of the tape measure assembly for paying out the tape in a different orientation; and (6) can employ a belt clip that is attached to a tape measure assembly. The foregoing desired characteristics are provided by the unique combination tape measure and straight edge apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a combination tape measure and straight edge apparatus which includes a first straight edge segment which includes an outer edge and an inner edge, and the inner edge includes first hinge members. A tape measure assembly support unit includes second hinge members that engage the first hinge members. A tape measure assembly is provided, and a connector is provided for attaching the tape measure assembly to the tape measure assembly support unit. The second hinge members of the tape measure assembly support unit permit the tape measure assembly support unit and the attached tape measure assembly to be rotated around the first hinge members so that the tape measure assembly can be moved, with respect to the first straight edge segment, from a plurality of storage orientations to a plurality of in-use orientations or from a plurality of in-use orientations to a plurality of storage orientation.

The first straight edge segment includes a first end and a second end. A guide member is connected to the outer edge of the first straight edge segment. The guide member is connected to the first straight edge segment at a right angle.

A second straight edge segment is connected to the first end of the first straight edge segment. The second straight edge segment is oriented perpendicular to the first straight edge segment. The second straight edge segment includes a first end and a second end. The first end of the second straight edge segment is connected to the first end of the first straight edge segment.

A third straight edge segment is connected between the first straight edge segment and the second straight edge segment. The third straight edge segment includes a first end and a second end. The first end of the third straight edge segment is connected to the second end of the first straight edge segment, and the second end of the third straight edge segment is connected to the second end of the second straight edge segment. The first straight edge segment, the second straight edge segment, and the third straight edge segment form a right triangle.

The right triangle formed is a right isosceles triangle. In this respect, the second straight edge segment is oriented at a ninety degree angle with respect to the first straight edge segment, and the third straight edge segment is oriented at a forty-five degree angle with respect to both the second straight edge segment and the first straight edge segment. The first straight edge segment, the second straight edge segment, and the third straight edge segment are formed as a unified, integrated right triangle.

The tape measure assembly support unit includes riser members which support the second hinge members. A support floor supports the riser members. A bottom portion of the tape measure assembly rests upon the support floor. A first standing wall is connected to the support floor and extends upward therefrom. The tape measure assembly is connected to the first standing wall. A second standing wall is connected to the support floor and extends upward therefrom.

A lock tab support extends upward from the second standing wall. A pair of lock tabs are supported by the lock tab support. The lock tab support is oriented with respect to the second standing wall at approximately a one hundred thirty-five degree angle. The third straight edge segment includes an inside locking portion which is parallel to the lock tab support when the lock tabs engage the third straight edge segment. The second straight edge segment includes an inside locking portion which is parallel to the lock tab support when the lock tabs engage the second straight edge segment. The lock tabs are spaced apart a separation distance to permit either the second straight edge segment or the third straight edge segment to be received therebetween. The first standing wall is perpendicular to the support floor.

The second straight edge segment includes a first external scale, a first internal slot, and a first internal scale. The third straight edge segment includes a second external scale, a second internal slot, a second internal scale, and a third internal scale.

A tape assembly clip is connected to the tape measure assembly with a portion of the tape measure assembly support unit positioned between the tape assembly clip and the tape measure assembly. The tape assembly clip is connected to the tape measure assembly using a screw connector which passes through a portion of the tape assembly clip, through a portion of the tape measure assembly support unit, and into a screw reception well in the tape measure assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology, and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved combination tape measure and straight edge apparatus which has all of the advantages of the prior art and none of the disadvantages.

It is another object of the present invention to provide a new and improved combination tape measure and straight edge apparatus which may be easily and efficiently manufactured and marketed.

It is a further object of the present invention to provide a new and improved combination tape measure and straight edge apparatus which is of durable and reliable construction.

An even further object of the present invention is to provide a new and improved combination tape measure and straight edge apparatus which is susceptible of a low cost of manufacture with regard to both materials and labor, and which accordingly is then susceptible of low prices of sale to the consuming public, thereby making such combination tape measure and straight edge apparatus available to the buying public.

Still yet a further object of the present invention is to provide a new and improved combination tape measure and straight edge apparatus in which it is not necessary to have a hinge pin and a sleeve for the hinge pin.

Still another object of the present invention is to provide a new and improved combination tape measure and straight edge apparatus that permits a number of standard tape measure assemblies to be used interchangeably with the apparatus.

Yet another object of the present invention is to provide a new and improved combination tape measure and straight edge apparatus which permits the tape measure assembly to be used separately and independently of the straight edge.

Even another object of the present invention is to provide a new and improved combination tape measure and straight edge apparatus that permits the tape measure assembly to be locked in an orientation so that the tape measure assembly is substantially coplanar with the straight edge.

Still a further object of the present invention is to provide a new and improved combination tape measure and straight edge apparatus in which it is relatively easy to change the orientation of the tape measure assembly for paying out the tape in a different orientation.

Yet another object of the present invention is to provide a new and improved combination tape measure and straight edge apparatus that can employ a belt clip that is attached to the tape measure assembly.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an edge view of the embodiment of the combination tape measure and straight edge apparatus of FIG. 2 taken along line 3—3 thereof.

FIG. 4 is a front view of embodiment of the invention shown in FIG. 2, wherein the tape measure assembly is oriented for paying tape out towards the hypotenuse of the right triangle of the straight edge.

FIG. 7 is an exploded perspective view showing the tape measure assembly and its relationship to the tape measure assembly support unit of the invention.

FIG. 8 is an exploded side view showing the tape measure assembly and its relationship to the tape measure assembly support unit of the invention.

DESCRIPTION OF THE PREFERRED EMBODIMENT

Figure 1:
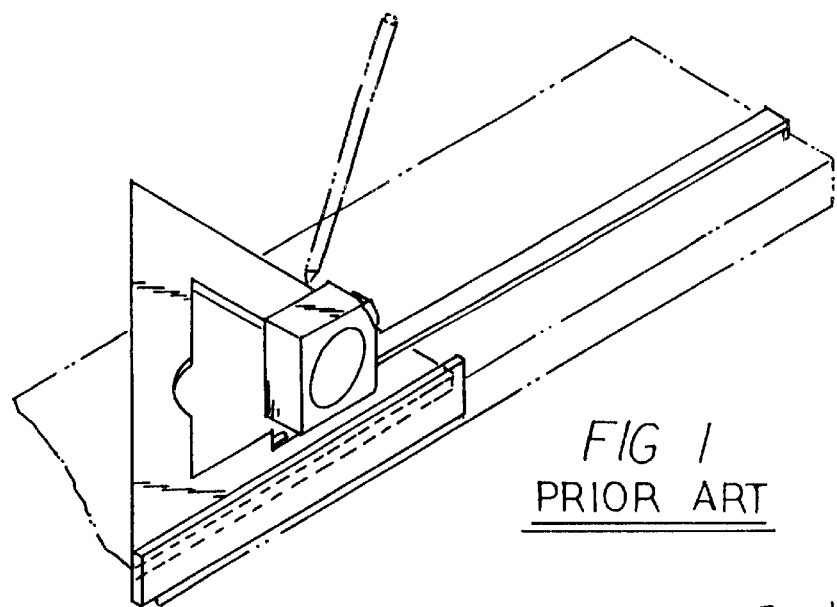
FIG. 1 is a perspective view showing a PRIOR ART combination tape measure and straight edge apparatus disclosed in U.S. Pat. No. 5,481,810.

With reference to the drawings, a new and improved combination tape measure and straight edge apparatus embodying the principles and concepts of the present invention will be described.

Turning to FIGS. 1–8, there is shown an exemplary embodiment of the combination tape measure and straight edge apparatus of the invention generally designated by reference numeral 10. In its preferred form, combination tape measure and straight edge apparatus 10 includes a first straight edge segment 12 which includes an outer edge 14 and an inner edge 16, and the inner edge 16 includes first hinge members 23. A tape measure assembly support unit 21 includes second hinge members 25 that engage the first hinge members 23. A tape measure assembly 20 is provided, and a connector is provided for attaching the tape measure assembly 20 to the tape measure assembly support unit 21. The second hinge members 25 of the tape measure assembly support unit 21 permit the tape measure assembly support unit 21 and the attached tape measure assembly 20 to be rotated around the first hinge members 23 so that the tape measure assembly 20 can be moved, with respect to the first straight edge segment 12, from a plurality of storage orientations to a plurality of in-use orientations or from a plurality of in-use orientations to a plurality of storage orientation.

The first straight edge segment 12 includes a first end 26 and a second end 28. A guide member 13 is connected to the outer edge 14 of the first straight edge segment 12. The guide member 13 is connected to the first straight edge segment 12 at a right angle.

A second straight edge segment 30 is connected to the first end 26 of the first straight edge segment 12. The second straight edge segment 30 is oriented perpendicular to the first straight edge segment 12. The second straight edge segment 30 includes a first end 32 and a second end 34. The first end 32 of the second straight edge segment 30 is connected to the first end 26 of the first straight edge segment 12.

A third straight edge segment 36 is connected between the first straight edge segment 12 and the second straight edge segment 30. The third straight edge segment 36 includes a first end 38 and a second end 40. The first end 38 of the third straight edge segment 36 is connected to the second end 28 of the first straight edge segment 12, and the second end 40 of the third straight edge segment 36 is connected to the second end 34 of the second straight edge segment 30. The first straight edge segment 12, the second straight edge segment 30, and the third straight edge segment 36 form a right triangle.

The right triangle formed is a right isosceles triangle. In this respect, the second straight edge segment 30 is oriented at a ninety degree angle with respect to the first straight edge segment 12, and the third straight edge segment 36 is oriented at a forty-five degree angle with respect to both the second straight edge segment 30 and the first straight edge segment 12. The first straight edge segment 12, the second straight edge segment 30, and the third straight edge segment 36 are formed as a unified, integrated right triangle.

The tape measure assembly support unit 21 includes riser members 27 which support the second hinge members 25. A support floor 29 supports the riser members 27. A bottom portion of the tape measure assembly 20 rests upon the support floor 29. A first standing wall 31 is connected to the support floor 29 and extends upward therefrom. The tape measure assembly 20 is connected to the first standing wall 31. A second standing wall 33 is connected to the support floor 29 and extends upward therefrom.

A lock tab support 35 extends upward from the second standing wall 33. A pair of lock tabs 37 are supported by the lock tab support 35. The lock tab support 35 is oriented with respect to the second standing wall 33 at approximately a one hundred thirty-five degree angle. The third straight edge segment 36 includes an inside locking portion 41 which is parallel to the lock tab support 35 when the lock tabs 37 engage the third straight edge segment 36. The second straight edge segment 30 includes an inside locking portion 43 which is parallel to the lock tab support 35 when the lock tabs 37 engage the second straight edge segment 30. The lock tabs 37 are spaced apart a separation distance 39 to permit either the second straight edge segment 30 or the third straight edge segment 36 to be received therebetween. The first standing wall 31 is perpendicular to the support floor 29.

The second straight edge segment 30 includes a first external scale 45, a first internal slot 47, and a first internal scale 49. The third straight edge segment 36 includes a second external scale 51, a second internal slot 53, a second internal scale 55, and a third internal scale 57.

A tape assembly clip 59 is connected to the tape measure assembly 20 with a portion of the tape measure assembly support unit 21 positioned between the tape assembly clip 59 and the tape measure assembly 20. The tape assembly clip 59 is connected to the tape measure assembly 20 using a screw connector 61 which passes through a portion of the tape assembly clip 59, through a portion of the tape measure assembly support unit 21, and into a screw reception well 63 in the tape measure assembly 20.

The combination tape measure and straight edge apparatus 10 of the invention can be used in a number of ways.

A first mode of use, a storage mode, is illustrated in FIGS. 2, 3, 5, and 6. In this mode of use, the lock tab support 35 is parallel to the inside locking portion 41 of the third straight edge segment 36, and the lock tabs 37 engage the inside locking portion 41 therebetween. In this mode of use, the tape measure assembly 20 is in a plane that is coplanar with the triangle formed by the first straight edge segment 12, the second straight edge segment 30, and the third straight edge segment 36.

Figure 2:
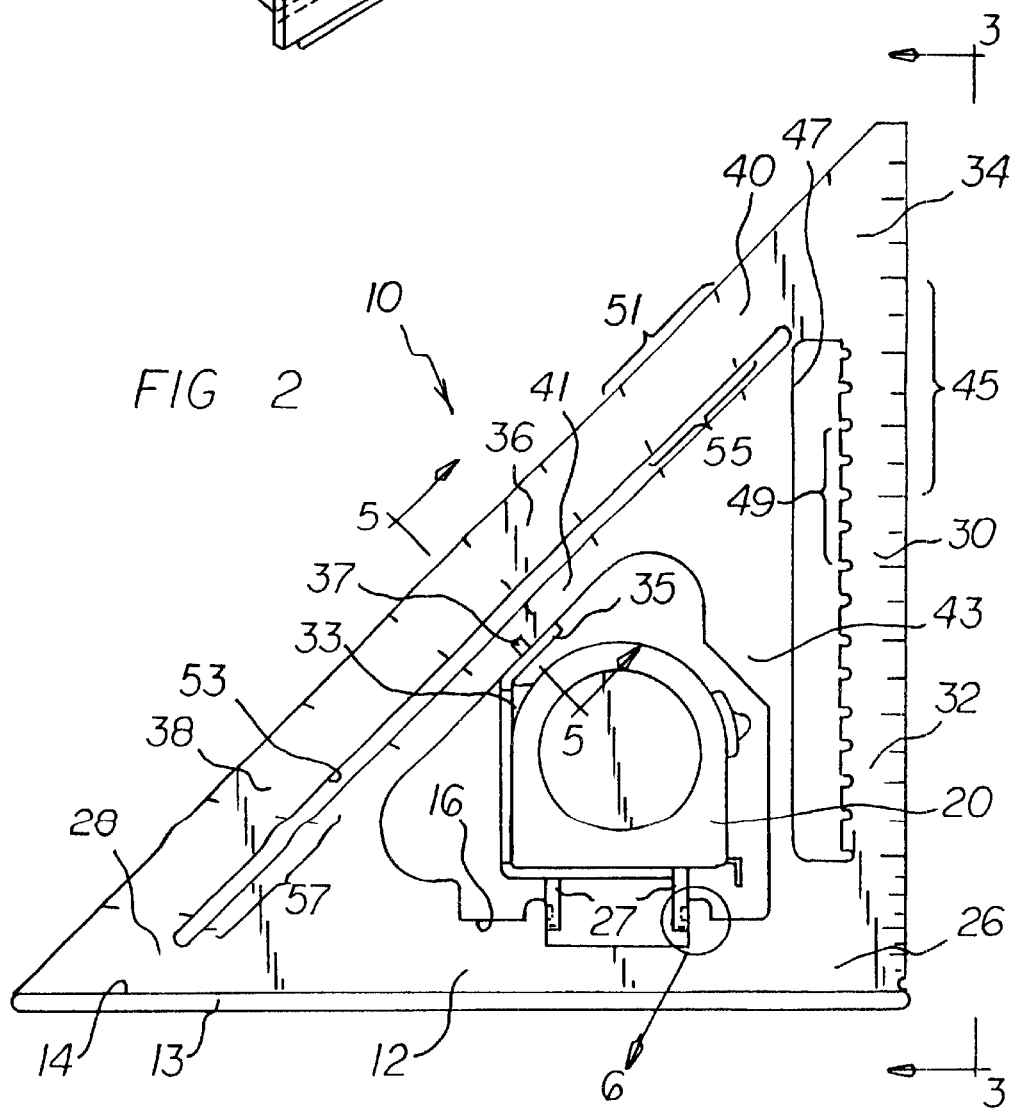
FIG. 2 is a front view of a preferred embodiment of the combination tape measure and straight edge apparatus of the present invention, wherein the tape measure assembly is oriented for paying tape out towards the right side of the right triangle of the straight edge.
Figure 5:
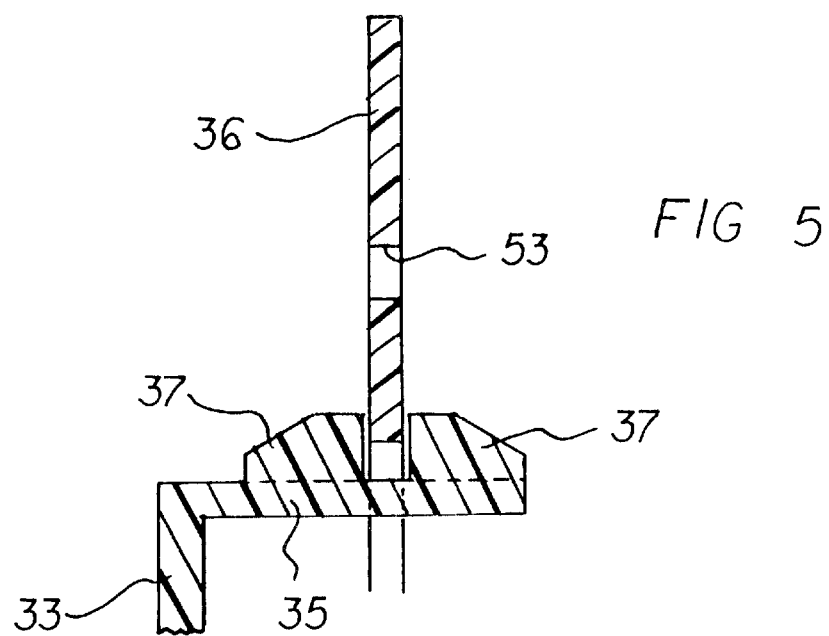
FIG. 5 is an enlarged partial cross-sectional view of the embodiment of the invention shown in FIG. 2 taken along line 5—5 thereof.
Figure 6:
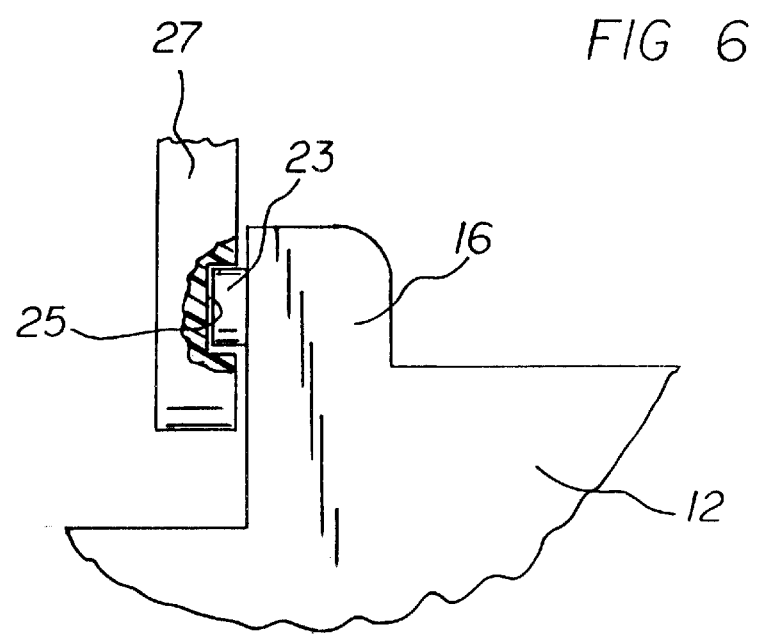
FIG. 6 is an enlarged view of the circled region 6 of FIG. 2.

In a second mode of use, an in-use mode, the lock tabs 37 are disengaged from the inside locking portion 41, and the tape measure assembly support unit 21 along with the supported tape measure assembly 20 are rotated behind the plane in FIG. 2 in which the triangle lies. Rotation is provided by the second hinge members 25 rotating around the first hinge members 23. In this mode of use, the tape measure assembly 20 can be oriented in a plane that is perpendicular to the plane of the triangle. In this mode of use, the tape inside the tape measure assembly 20 can be payed out from the tape measure assembly 20 in a direction towards the second straight edge segment 30.

In a third mode of use, an in-use mode, the lock tabs 37 are disengaged from the inside locking portion 41, and the tape measure assembly support unit 21 along with the supported tape measure assembly 20 are rotated in front of the plane in FIG. 2 in which the triangle lies. Rotation is provided by the second hinge members 25 rotating around the first hinge members 23. In this mode of use, the tape measure assembly 20 can be oriented in a plane that is perpendicular to the plane of the triangle. In this mode of use, the tape inside the tape measure assembly 20 can also be payed out from the tape measure assembly 20 in a direction towards the second straight edge segment 30.

A fourth mode of use, a storage mode, is illustrated in FIG. 4 in which the lock tab support 35 is parallel to the inside locking portion 43 of the second straight edge segment 30, and the lock tabs 37 engage the inside locking portion 43 therebetween. To arrive at this mode of use, the lock tabs 37 are disengaged from the inside locking portion 41, the second hinge members 25 are disengaged from the first hinge members 23, and the tape measure assembly support unit 21, along with the supported tape measure assembly 20, are turned on an about face. As a result, the first standing wall 31 faces upward from the triangle in FIG. 4. Then, the second hinge members 25 are engaged with the first hinge members 23 again. Also, the tape measure assembly support unit 21 and the supported tape measure assembly 20 are rotated on the second hinge members 25 and the first hinge members 23 so that the lock tabs 37 are engaged with the inside locking portion 43. In this mode of use, the tape measure assembly 20 is in a plane that is coplanar with the triangle formed by the first straight edge segment 12, the second straight edge segment 30, and the third straight edge segment 36.

In a fifth mode of use, an in-use mode, the lock tabs 37 are disengaged from the inside locking portion 43, and the tape measure assembly support unit 21 along with the supported tape measure assembly 20 are rotated behind the plane in FIG. 4 in which the triangle lies. Rotation is provided by the second hinge members 25 rotating around the first hinge members 23. In this mode of use, the tape measure assembly 20 can be oriented in a plane that is perpendicular to the plane of the triangle. In this mode of use, the tape inside the tape measure assembly 20 can be payed out from the tape measure assembly 20 in a direction towards the third straight edge segment 36.

In a sixth mode of use, an in-use mode, the lock tabs 37 are disengaged from the inside locking portion 43, and the tape measure assembly support unit 21 along with the supported tape measure assembly 20 are rotated in front of the plane in FIG. 4 in which the triangle lies. Rotation is provided by the second hinge members 25 rotating around the first hinge members 23. In this mode of use, the tape measure assembly 20 can be oriented in a plane that is perpendicular to the plane of the triangle. In this mode of use, the tape inside the tape measure assembly 20 can also be payed out from the tape measure assembly 20 in a direction towards the third straight edge segment 36.

In a seventh mode of use, suggested by FIGS. 7 and 8, the lock tabs 37 are disengaged from the inside locking portion 43, and the second hinge members 25 are disengaged from the first hinge members 23. Then, the tape measure assembly support unit 21, with the supported tape measure assembly 20, can be moved to a person. The tape assembly clip 59 can then be clipped onto a person's belt. In this way, the tape measure assembly 20 and the tape measure assembly support unit 21 stay together as a unit that is carried by the wearer's belt. Alternatively, the tape measure assembly support unit 21, can be left in its assembled condition i.e. attached to the triangle and the entire assembly comprising the tape measure assembly, the tape measure support assembly and the triangle worn on a persons's belt utilizing the tape assembly clip 59 as will occur to those of ordinary skill in the art.

With the combination tape measure and straight edge apparatus 10 of the invention, a particular tape measure assembly 20 can easily be removed from the tape measure assembly support unit 21 and replaced with another interchangeable tape measure assembly 20. With the invention, the second standing wall 33 is sufficiently flexible so that the second standing wall 33 can be bent to permit the lock tabs 37 to move over either the inside locking portion 41 or the inside locking portion 43. In addition, the riser members 27 and the support floor 29 are sufficiently flexible so that the second hinge members 25 can move or ride over the first hinge members 23.

The components of the combination tape measure and straight edge apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved combination tape measure and straight edge apparatus that is low in cost, relatively simple in design and operation, and which may advantageously be used without needing to have a hinge pin and a sleeve for the hinge pin. With the invention, a combination tape measure and straight edge apparatus is provided which permits a number of standard tape measure assemblies to be used interchangeably with the apparatus. With the invention, a combination tape measure and straight edge apparatus is provided which permits the tape measure assembly to be used separately and independently of the straight edge. With the invention, a combination tape measure and straight edge apparatus is provided which permits the tape measure assembly to be locked in an orientation so that the tape measure assembly is substantially coplanar with the straight edge. With the invention, a combination tape measure and straight edge apparatus is provided in which it is relatively easy to change the orientation of the tape measure assembly for paying out the tape in a different orientation. With the invention, a combination tape measure and straight edge apparatus is provided which can employ a belt clip that is attached to a tape measure assembly.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the united states is as follows:

1. A combination tape measure and straight edge apparatus, comprising:
    a first straight edge segment which includes an outer edge and an inner edge, wherein said inner edge includes first hinge members,
    a tape measure assembly support unit which includes second hinge members that engage said first hinge members,
    a tape measure assembly, and connector means for attaching said tape measure assembly to said tape measure assembly support unit,
        wherein said second hinge members of said tape measure assembly support unit permit said tape measure assembly support unit and said attached tape measure assembly to be rotated around said first hinge members so that said tape measure assembly can be moved, with respect to said first straight edge segment, from a storage orientation to a plurality of in-use orientations or from a plurality of in-use orientations to a storage orientation,
    further including:
        a second straight edge segment connected to said first end of said first straight edge segment,
        wherein said second straight edge segment is oriented perpendicular to said first straight edge segment,
        wherein said first straight edge segment includes a first end and a second end, said second straight edge segment includes a first end and a second end, and said first end of said second straight edge segment is connected to said first end of said first straight edge segment,
    further including a third straight edge segment connected between said first straight edge segment and said second straight edge segment, wherein said third straight edge segment includes a first end and a second end, said first end of said third straight edge segment is connected to said second end of said first straight edge segment, and said second end of said third straight edge segment is connected to said second end of said second straight edge segment,
    wherein said second straight edge segment is oriented at a ninety degree angle with respect to said first straight edge segment, and said third straight edge segment is oriented at a forty-five degree angle with respect to both said second straight edge segment and said first straight edge segment,
    wherein said first straight edge segment, said second straight edge segment, and said third straight edge segment are formed as a unified, integrated right triangle,
    wherein said tape measure assembly support unit includes:
        riser members which support said second hinge members,
        a support floor which supports said riser members, wherein a bottom portion of said tape measure assembly rests upon said support floor,
        a first standing wall connected to said support floor and extending upward therefrom, wherein said tape measure assembly is connected to said first standing wall,
        a second standing wall connected to said support floor and extending upward therefrom,
        a lock tab support extending upward from said second standing wall, and
        a pair of lock tabs supported,by said lock tab support.

2. The apparatus of claim 1, further including:
    a guide member connected to said outer edge of said first straight edge segment.

3. The apparatus of claim 1 wherein said guide member is connected to said first straight edge segment at a right angle.

4. The apparatus of claim 1 wherein said lock tab support is oriented with respect to said second standing wall at approximately a one hundred thirty-five degree angle.

5. The apparatus of claim 4 wherein said third straight edge segment includes an inside locking portion which is parallel to said lock tab support when said lock tabs engage said third straight edge segment.

6. The apparatus of claim 5 wherein said second straight edge segment includes an inside locking portion which is parallel to said lock tab support when said lock tabs engage said second straight edge segment.

7. The apparatus of claim 1 wherein said lock tabs are spaced apart a separation distance to permit either said second straight edge segment or said third straight edge segment to be received therebetween.

8. The apparatus of claim 1 wherein said first standing wall is perpendicular to said support floor.

9. The apparatus of claim 1 wherein said second straight edge segment includes a first external scale, a first internal slot, and a first internal scale.

10. The apparatus of claim 1 wherein said third straight edge segment includes a second external scale, a second internal slot, second internal scale, and a third internal scale.

11. The apparatus of claim 1, further including:
a tape assembly clip connected to said tape measure assembly with a portion of said tape measure assembly support unit positioned between said tape assembly clip and said tape measure assembly.

12. The apparatus of claim 11 wherein said tape assembly clip is connected to said tape measure assembly using a screw connector which passes through a portion of said tape assembly clip, through a portion of said tape measure assembly support unit, and into a screw reception well in said tape measure assembly.

13. The apparatus of claim 11 wherein said tape assembly clip is adapted to enable a person to carry said tape measure assembly support unit and said tape measure assembly on a belt worn by said person.

* * * * *